United States Patent [19]

Revak et al.

[11] 4,421,529

[45] Dec. 20, 1983

[54] MEMBRANE SYSTEM FOR INTERMITTENT GAS SEPARATION

[75] Inventors: Timothy T. Revak; Robert T. Krueger, both of Concord, Calif.

[73] Assignee: The Dow Chemical Company, Midland, Mich.

[21] Appl. No.: 394,954

[22] Filed: Jul. 2, 1982

[51] Int. Cl.³ .............................................. B01D 53/22
[52] U.S. Cl. ........................................... 55/16; 55/21; 55/69
[58] Field of Search ...................... 55/16, 21, 158, 210, 55/213, 68, 69, 218

[56] References Cited

U.S. PATENT DOCUMENTS

| | | | |
|---|---|---|---|
| 2,617,493 | 11/1952 | Jones | 183/115 |
| 2,924,630 | 2/1960 | Fleck | 55/16 |
| 3,241,293 | 3/1966 | Pfefferle | 55/16 |
| 3,398,504 | 8/1968 | Rubin | 55/158 |
| 3,442,002 | 5/1969 | Geary | 55/158 |
| 3,469,372 | 9/1969 | Yamauchi | 55/158 |
| 3,489,144 | 1/1970 | Dibelius | 55/158 |
| 3,782,904 | 1/1974 | Fletcher | 55/158 |
| 3,798,185 | 3/1974 | Skiens | 523/105 |
| 3,923,461 | 12/1975 | Barden | 23/232 |
| 3,930,814 | 1/1976 | Gessner | 55/16 |
| 4,119,417 | 10/1978 | Heki et al. | 55/158 |

FOREIGN PATENT DOCUMENTS 1017637  1/1966  United Kingdom ..................... 55/16

OTHER PUBLICATIONS

Walters, Process Natural Gas by Permeation, Petroleum Refiner, May 1959, 147–151.

R. J. Gardner et al., Chem. Eng. Proc., Oct. 1977, pp. 76–78.

Primary Examiner—Ernest G. Therkorn

[57] ABSTRACT

An improved process for separating gases using a hollow fiber membrane on an intermittent basis is described. It has been found that if the pressure on the feed side of the membrane is maintained essentially constant or is allowed to vary slowly during operation and in the periods between operating cycles the useful lifetime of the separation device is greatly extended. This process is particularly useful for the separation of air into oxygen- and nitrogen-enriched streams using hollow fibers melt spun from poly(4-methylpentene-1).

7 Claims, 2 Drawing Figures

MEMBRANE SYSTEM FOR INTERMITTENT GAS SEPARATION

BACKGROUND OF THE INVENTION

This invention relates to an improved method for using hollow fiber membranes to separate gas mixtures where the demand is not continuous.

The use of hollow fiber membranes to separate gas mixtures has been the object of considerable research during the past twenty years. U.S. Pat. No. 3,798,185 describes hollow fibers made from a variety of thermoplastics to which polyorganosiloxane has been added. U.S. Pat. No. 4,068,387 discloses a method for drying cellulose ester membranes for use in gas separation. A method for the recovery of hydrogen from ammonia synthesis purge streams utilizing membrane separation devices is described in U.S. Pat. No. 4,180,552. Multicomponent membranes for gas separations are claimed in U.S. Pat. No. 4,230,463. The separation of hydrogen sulfide from methane using capillary fibers is taught in U.S. Pat. No. 3,534,528.

The systems described in the prior art for the separation of a gas mixture via a semi-permeable membrane generally contemplate continuous operation. See, e.g., U.S. Pat. No. 4,119,417. U.S. Pat. No. 3,923,461 discloses the alternative routing of a carrier gas to either the permeate side of the membrane or to a detector, but intermittent operation is not explicitly discussed.

In many specific applications of membrane devices for gas separation, the separated gases are not required on a continuous basis. Since energy is expended in providing feed gas at operating pressure for separation, usually feed gas is only provided to the separation device when the separated gases are needed. On demand, the feed gas can rapidly be introduced to the separation device at operating pressure.

It has now been discovered that such pressure cycling can have a deleterious effect on the permeation characteristics of hollow fiber membranes. A method is disclosed for increasing the useful lifetime of hollow fiber membranes subject to intermittent use.

SUMMARY OF THE INVENTION

An improved method for pressure cycling hollow fiber membranes subject to intermittent use has been discovered. In this process a device containing hollow fiber membranes preferentially permeable to at least one component of a gas mixture is used to separate gases from the gas mixture. The improvement consists in changing the pressure on the feed side of the hollow fiber membrane slowly so as to avoid sudden changes in pressure which deleteriously affect the selectivity of the device after a number of cycles. The pressure on the permeate side of the hollow fiber membrane can be varied to meet demand.

By avoiding sudden changes in pressure on the feed side of the membrane, the permeability and selectivity of the hollow fiber membrane device is maintained after a number of cycles. If the composition of both the permeate and reject gases is maintained by adjusting the flow rate of the feed gas to the membrane, the flow rate of feed gas to the membrane after 1000 cycles is at least 20 percent greater than a similar device repeatedly subjected to pressure changes of 75 pounds per square inch (psi) in a period of 15 seconds during each cycle. By the term intermittent use is meant that at least 10 percent of the time the permeation flux through the hollow fiber membrane is no greater than 50 percent of its mean value during the entire period of both operation and non-use.

DETAILED DESCRIPTION OF THE INVENTION

Hollow fiber membrane devices for the separation of fluids are well-known in the prior art. U.S. Pat. Nos. 3,228,876, 3,455,460 and 4,061,574 describe such devices and the relevant portions of these patents are incorporated herein by reference. Typically, the hollow fibers are packed in a generally longitudinal orientation about a perforated core through which feed gas can be introduced to the hollow fiber bundle. A tubesheet is formed near at least one end of the hollow fiber bundle, while a tubesheet or endsheet is present near the opposite ends of the fibers. The tubesheet and endsheet are usually made from an epoxy or other thermosetting resin. In operation, the tubesheet or tubesheets are sealingly engaged with a pressure casing which defines a space external to the hollow fibers which does not communicate directly with the bores of the hollow fibers.

The invention described herein is not limited to any particular configuration of a hollow fiber membrane separation device. However, the standard configuration described hereinbefore is preferred. One knowledgeable in the membrane field would recognize that other configurations for the hollow fiber module are feasible. For example, the hollow fibers may be arranged such that both ends of the fiber protrude through a single tubesheet.

Figure 1:
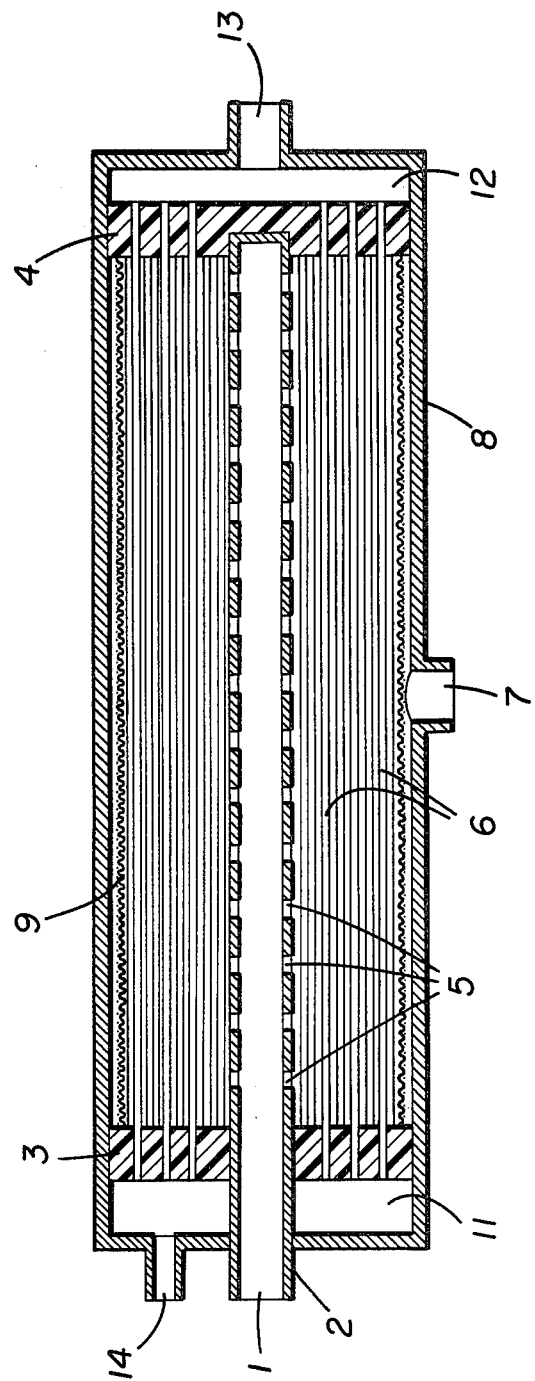
FIG. 1 is a schematic cross-section of a hollow fiber membrane separation device.

FIG. 1 depicts in cross-section for purposes of illustration a hollow fiber membrane gas separation device that could be used in this invention. The gas to be separated is introduced into the inlet 1 of the gas feed pipe 2. The gas feed pipe passes through a first tubesheet 3 and terminates in a second tubesheet 4. The section of the gas feed pipe between these two tubesheets contains a plurality of perforations 5 through which the feed gas passes to contact the external surfaces of a number of hollow fibers 6 arranged in a generally longitudinal fashion about the perforated feed pipe. Wrapped around the hollow fiber bundle is a porous polymer outer wrap 9, which helps to prevent shifting of fibers in the bundle. Some of the feed gas passes axially and radially through the hollow fiber bundle to an outlet 7 in the pressure case surrounding the bundle. The remainder of the feed gas permeates through the walls of hollow fibers. The bores of the hollow fibers communicate at each end through the tubesheet with a header space 11 and 12 on the far side of both tubesheets. The gas which has permeated through the hollow fibers and collected in the header space can be removed through outlets 13 and 14 in the pressure case which each communicate with one of the header spaces. Optionally, a sweep gas could be introduced into one header space and removed through the outlet in the other header space to assist in the collection of the permeate.

The feed gas in the instant method is preferably introduced so as to contact the external surface of the hollow fibers. Introduction of the feed gas into the bores of the hollow fibers generally has a deleterious affect on the selectivity and integrity of the fibers over a period of time even where the feed gas pressure is carefully regulated to avoid sudden pressure changes.

Figure 2:
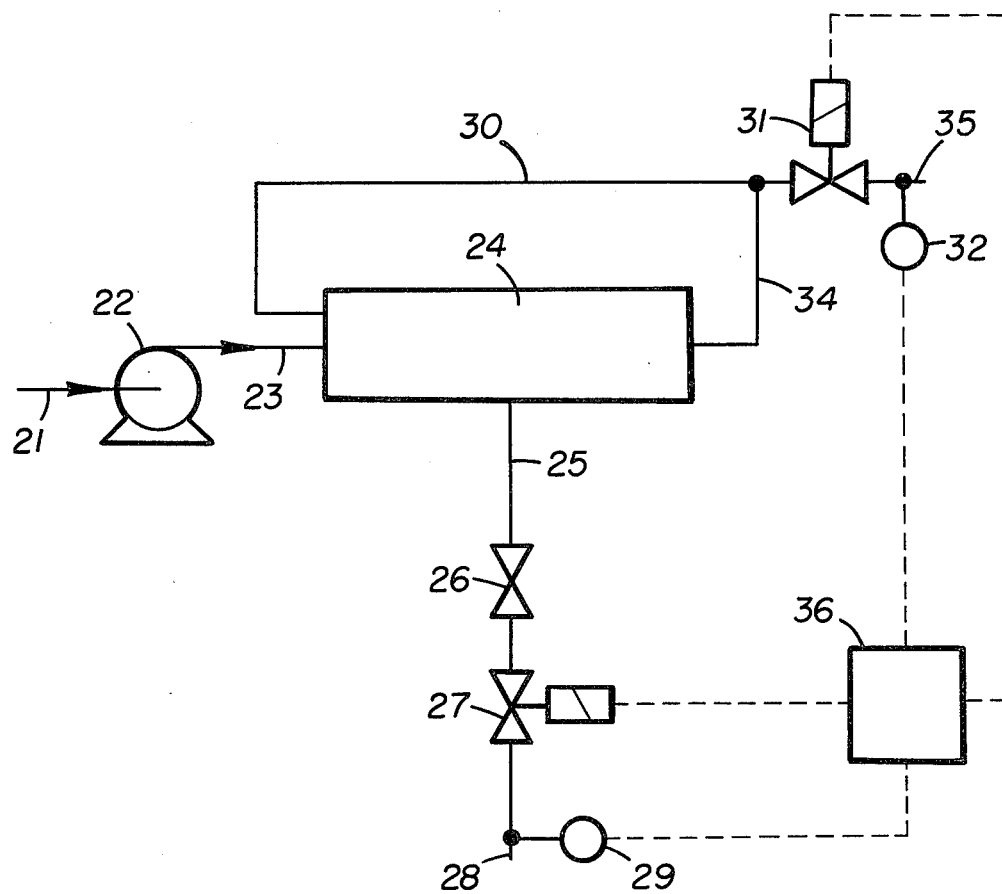
FIG. 2 is a simplified schematic flow diagram of a separation device and control system.

A simplified schematic diagram of one possible system for regulating rate of pressure change on the feed side of the hollow fiber membrane is presented in FIG. 2. The feed gas is conducted through a line 21 to a gas compressor 22 which brings the gas to the desired operating pressure. The pressurized gas is conducted through a line 23 to the external surface of the hollow fibers in a membrane gas separation device 24, similar to the one depicted in FIG. 1. The portion of the feed gas which does not permeate through the walls of the hollow fibers is removed from the separation device through line 25 having a throttling valve 26, a solenoid valve 27 and a means for determining demand for the non-permeating gas 29. The gas which does not permeate can be conducted through line 28 to a storage vessel or reaction vessel. The means for determining gas demand 29 can be a simple pressure sensor which indicates when the capacity of the storage vessel has been reached.

The permeate is conducted from the head spaces in the separation device by line 30 and line 34 which is connected to line 30. A solenoid valve 31 and a means for measuring permeate gas demand are present on the permeate lines. The permeate can be conveyed through a line 35 to a storage vessel or reaction vessel as needed.

The gas demand sensors 29 and 32 are monitored by a control system 36, which can be a human or machine agency known in the art. When the demand for the gases monitored by sensors 29 and 32 fall below certain preset values, the solenoid valves on both the permeate and permeate-deficient gas lines are closed by the control system. The solenoid valves are re-opened by the control system when the demand for the gases exceeds certain preset values. In some embodiments of this invention the demand for only one gas will be critical, while the supply of the other gas can be varied as a matter of convenience. In such instances only the demand for the gas of interest need be monitored and this value can be used to control the solenoid valves on both gas exit lines.

The skilled artisan will appreciate that other pieces of equipment, such as filters, gas coolers, throttle valves and back pressure regulators, although not depicted, can be used to advantage in some instances. In one preferred embodiment, the pressure in the head space of the separation device and external to the hollow fibers in the pressure case is monitored after the solenoid valve in the gas exit lines have closed. When the transmembrane pressure approaches zero, a solenoid valve in the feed gas line is also closed and the feed compressor is turned off to save energy. When gas separation is to be resumed, the feed gas compressor is turned back on before any of the solenoid valves are opened to avoid pressure surges. Of course, this mode of operation can only be practiced where the pressure on the feed side of the membrane remains essentially constant while the compressor is off.

In practice, during extended periods when the separation device is not being utilized the gases external to the membrane and on the permeate-side of the membrane will converge in composition. Therefore, it may be desirable to provide means for diverting the gases first produced when operation of the separation device is resumed after a long period of non-use.

One of ordinary skill in the art will appreciate that numerous other methods can be employed to prevent deleterious sudden changes in pressure on the feed side of the hollow fiber membrane. For example, a throttling valve might be employed on the feed gas inlet to restrict the gas flow rate. This throttling valve could be switched out of the feed gas circuit once operating pressures are reached. Alternatively, a gas accumulator can be inserted in the feed gas stream. To eliminate sudden changes in pressure on the feed side of the hollow fibers the volume occupied by the gas accumulator must be relatively large compared to the capacity of the gas compressor. The aforementioned techniques for moderating feed gas pressure by their very nature prolong the period required to reach operating pressure on the feed side of the membrane.

It should be noted that a number of separation devices can be connected in parallel or series to increase capacity and/or to improve separation. The skilled artisan can readily adapt the teachings herein to such configurations.

The hollow fibers used in the subject separation process can be fabricated from any material used for that purpose in the art. As is known in the art, virtually any organic polymer which can be used to fabricate hollow fibers will exhibit selective permeability to some gases. The particular polymer chosen should exhibit particular selectivity in effecting the desired separation. Illustrative thermoplastic polymers which can be used to form hollow fiber membranes include polybutadiene, ethylene-vinyl acetate copolymers, butadiene-acrylonitrile copolymers, styrene-butadiene copolymers, polycarbonates, polyphenylene oxides, polyethylene, polyisobutylene, poly-cis-isoprene, copolymers of alpha-olefins, polyesters such as polyethylene terephthalate, polyvinyl chloride, polysulfones, perfluorocarbonsulfonic acid polymers, polyvinylpyrrolidone, polyamides and cellulose esters or ethers. Hollow fibers preferred in the subject application are those made from dry asymmetric cellulose acetate, such as those described in U.S. Pat. No. 4,068,387, or poly(4-methylpentene-1), as described in U.S. Pat. No. 3,798,185. Poly(4-methylpentene-1) hollow fibers essentially free of modifiers and additives are especially preferred.

The hollow fiber membrane can operably contain permeability modifiers, plasticizers and other additives. Multicomponent or multilayer membranes, such as those described in U.S. Pat. Nos. 3,874,986 and 4,230,463 are also operable.

Hollow fibers in general can be prepared by extrusion of the thermoplastic through a heated spinnerette at temperatures which produce a melt in a manner known in the art. Nitrogen gas or some other inert fluid is pumped through the center of the freshly spun fiber to prevent it from collapsing during cooling. The fiber can be drawn down to the desired size while still highly plastic by Godet rolls located a short distance from the spinnerette. With hollow fibers spun from a few polymers, such as poly(4-methylpentene-1), the rate of cooling of the freshly spun hollow fiber must be carefully controlled to provide a hollow fiber having optimum physical properties and permeability. The skilled artisan can readily determine empirically the spinning conditions for any particular polymer which produce a fiber having optimal properties.

The spinning of asymmetric cellulose acetate hollow fibers requires somewhat different conditions than symmetric hollow fiber membranes. U.S. Pat. No. 4,127,625 describe a method for producing hollow fibers from asymmetric membranes, which is incorporated herein by reference. The cellulose acetate hollow fibers generally can contain up to 40 weight percent of acetyl moieties.

The size of the hollow fiber bore and thickness of the walls of the fiber are generally not critical. Hollow fibers having an inside diameter of from about 25 to about 300 microns and an outside diameter of from about 35 to about 400 microns are suitable so long as the outside diameter is sufficiently greater than the inside diameter so that the hollow fiber does not collapse at the transmembrane pressures used in operation. For best performance it is generally desirable to maintain as low a pressure as practical on the permeate side during operation.

The transmembrane pressure, i.e., the pressure differential between the feed side of the hollow fiber membrane and the pressure on the permeate side of the membrane during operation, must be sufficient to promote permeation through the membrane at an acceptable rate but not so great that the hollow fiber is damaged or collapses. The operable range of transmembrane pressures depends on numerous factors, including the membrane material, the thickness of the membrane, the gases being separate, and the temperature during operation. Typically, a transmembrane pressure of at least about 10 pounds per square inch (psi), preferably at least about 40 psi, is employed. The upper limit on the transmembrane pressure is dictated by the strength of not only the hollow fiber membrane but also the ability of the associated lines and equipment to withstand pressure. Generally, transmembrane pressures with poly(4-methylpentene-1) hollow fibers above about 150 psi, while operable, are not desirable. For best performance it is generally desirable to maintain as low a pressure as practical on the permeate side during operation.

It has been observed that poly(4-methylpentene-1) hollow fiber membranes repeatedly subjected to pressure changes on the feed side of about 75 psi in about 10 to 15 seconds during start-up following a period of non-use suffer significant deterioration in performance compared to devices not subjected to such pressure changes. The susceptability of a particular hollow fiber device to rapid changes in pressure on the feed side of the membrane depends on the membrane material, the membrane thickness, the temperature during operation and numerous factors. Hence, no definitive guidance on acceptable rates of pressure change can be provided without first specifying these factors. However, in general a pressure change greater than 30 psi in 15 seconds should be avoided on the membrane feed side, especially where this pressure change occurs during the initial pressurization of the membrane.

The temperature of the gas feed and permeate should be high enough that they do not contain condensed gases in quantities that might deleteriously affect the hollow fiber membranes and so that permeation occurs at an economically feasible rate. The operating temperature should also be low enough that the membrane performance, lifetime and integrity is not adversely affected. Temperatures in the range from about 0° to about 40° C. are usually preferred. In general, ambient temperatures are convenient. Typically, the membrane device is most severely affected by sudden changes in feed pressure during cycling at the higher operating temperatures.

The gas mixture to be separated by the subject process can vary widely in composition. A membrane should be selected which is not adversely affected by the gas components present in the mixture and which is selectively permeable to the desired components. If the separation effected via one separation device is not satisfactory, a series of such devices can be employed.

In one preferred embodiment of the instant invention, a poly(4-methylpentene-1) hollow fiber membrane separation device can be used to separate air into oxygen-enriched and nitrogen-enriched streams. The oxygen-enriched gas can be used in certain medical applications or in chemical reactions wherein oxygen is a reactant. The nitrogen-enriched gas can be used as a gas blanket in vessels containing flammable liquids, thereby reducing the risk of combustion. All of the foregoing applications may involve intermittent use of the separation device.

In another preferred embodiment, a dry, asymmetric cellulose acetate hollow fiber membrane device is employed to separate carbon dioxide and hydrogen sulfide from natural gas. The carbon dioxide separated can then be injected into the natural gas well in accordance with well-known techniques to enhance gas or oil recovery.

The following example and comparative experiments are presented to illustrate the invention.

COMPARATIVE EXPERIMENT 1

A separation device similar to the one depicted in FIG. 1 was assembled. This device contained approximately $13.5 \times 10^6$ hollow fibers in a bundle about 8.25 inches in diameter. About 36 inches of each fiber were exposed between the epoxy resin tubesheets. The fibers were melt spun at about 325° C. from poly(4-methylpentene-1) available commercially from Mitsui Petrochemical under the trade name TPX, Grade DX-810. These fibers had an inside diameter of about 30 microns and an outside diameter of about 41 microns. The exposed portion fiber bundle was wrapped in DYNEL cloth in the region between the tubesheets.

Filtered, compressed air at a pressure of 75 psig was conveyed through a line equipped with an automated ball valve into the feed line of the separation device at a temperature of about 25° C. The oxygen-enriched permeate system was vented to the atmosphere. The nitrogen-enriched gas (96 volume percent $N_2$) which does not permeate through the hollow fibers is conducted into an exit line equipped with a throttle valve.

The automated ball valve in the gas feed line to the separation device was operated in cycles wherein it is closed for a period of 2.5 minutes, then was opened for a period of 2 minutes and then closed once again. To moderate the initial gas surge, this automated ball valve was opened slowly over a period of 7 seconds. This procedure was intended to simulate intermittent use of the separation device.

After 1000 operating cycles, the flow of nitrogen-enriched gas to the storage vessel during operation had declined to about 0.25 standard cubic feet per minute from the initial value of 2.45 standard cubic feet per minute. This represents a loss of nitrogen-enriched gas flow of almost 87 percent.

COMPARATIVE EXPERIMENT 2

A separation device was assembled in a manner similar to Comparative Experiment 1, except that strands of reinforcing tape were wrapped continuously about groups of poly(4-methylpentene-1) hollow fibers as these were assembled into the bundle. The tape is intended to solidify the bundle, preventing movement and loss of fiber integrity.

This separation device was tested for 1000 cycles in the separation of oxygen and nitrogen in the manner described in Comparative Experiment 1. The initial inert gas flow was 3.02 scfm. After 1000 cycles, the flow of nitrogen-enriched gas had declined to 1.96 scfm, which represents a decline of about 35 percent.

EXAMPLE 1

A gas separation device was assembled from poly(4-methylpentene-1) hollow fibers in a manner essentially identical to Comparative Experiment 1. However, the separation device was used in a system similar to the one depicted in FIG. 2. Filtered compressed air at a pressure of 75 psig was introduced to the gas feed inlet of the separation device at 25° C. The oxygen-enriched permeate was removed through a line containing a solenoid valve and vented to the atmosphere. The nitrogen-enriched gas, i.e., the gas which did not permeate through the hollow fibers, was removed through the pressure case of the separation device via a line containing a throttle valve and a solenoid valve. The solenoid valves in both the oxygen-enriched and nitrogen-enriched gas lines were operated in cycles wherein both are concurrently closed for 2.5 minutes, both valves are then opened for 2 minutes before being closed again. The valves open and close essentially instantaneously. The cycling procedure simulates intermittent use of the separation device.

The initial flow of nitrogen-enriched gas was determined to be about 3.41 scfm. After 1000 cycles, the flow of inert gas was about 3.46 scfm. This example demonstrates that by carefully controlling the pressure on the feed side of the hollow fiber membrane, the separation characteristics of the hollow fiber membrane are maintained through a large number of operating cycles.

What is claimed is:

1. In a process for separating gases from a mixture using a device containing a hollow fiber membrane preferentially permeable to at least one component of the gas mixture wherein the separation process is intermittent and the device is to be used in at least 1000 operating cycles separated by periods of non-use, the improvement wherein the pressure on the feed stream side of the membrane is maintained essentially constant or is varied relatively slowly during cycling between periods of non-use and initiation of gas separation such that after 1000 cycles of operation the selectivity of the membrane at the operating flow rate and other conditions of operation is at least 20 percent greater than that of an otherwise identical membrane which has been subjected to a pressure change of 75 psi in a period of 15 seconds at the start of each cycle of operation.

2. The process as described in claim 1 wherein the feed stream side of the membrane is the external surface of the hollow fiber.

3. The process as described in claim 2 wherein the pressure on the feed stream side of the hollow fiber is maintained essentially constant while the flow of the gases separated by the membrane is controlled by separate valves on the reject and permeate streams, said valves being opened together when gas separation is initiated and concurrently closed when an operation cycle is at an end.

4. The process as described in claim 3 wherein when the valves controlling flow of reject and permeate are closed and the pressure difference across the membrane approaches zero, a valve controlling flow of feed gas to the membrane is then also closed until such time as gas separation is to be resumed.

5. The process as described in claim 2 wherein the pressure on the feed side of the hollow fiber changes by no more than about 30 psi in a period of 15 seconds during each cycle.

6. The process as described in claim 1 or 2 wherein the hollow fiber is fabricated predominantly from poly(4-methylpentene-1) or from a dry, asymmetric cellulose acetate.

7. The process as described in claim 2 wherein a poly(4-methylpentene-1) hollow fiber is used to separate a gas mixture containing oxygen and nitrogen.

* * * * *